United States Patent [19]

Beyler

[11] 4,164,912

[45] Aug. 21, 1979

[54] METHOD FOR REDUCING POLLUTION DUE TO AN INTERNAL COMBUSTION ENGINE

[76] Inventor: Roland R. C. Beyler, 61, Ave. du Maréchal Joffre, 94360 Bry-sur-Marne, France

[21] Appl. No.: 865,124

[22] Filed: Dec. 28, 1977

[30] Foreign Application Priority Data

Dec. 29, 1976 [FR] France ................................ 76 39821

[51] Int. Cl.² ............................ F02P 1/00; F02B 3/00
[52] U.S. Cl. .................................. 123/26; 123/169 V; 123/169 MG; 123/148 DS; 123/146.5 A
[58] Field of Search ........ 123/148 R, 148 DS, 148 C, 123/169 V, 26, 146.5 A

[56] References Cited

U.S. PATENT DOCUMENTS

| 2,011,986 | 8/1935 | Schwarz | 123/26 |
|---|---|---|---|
| 2,756,268 | 1/1956 | Knudson | 123/148 DS |
| 2,994,310 | 8/1961 | Hopwood | 123/26 |
| 3,204,139 | 8/1965 | Candelise | 123/26 |
| 3,483,849 | 12/1969 | Yamamoto | 123/26 |
| 4,061,113 | 12/1977 | Beyler | 123/26 |

*Primary Examiner*—Ronald B. Cox
*Attorney, Agent, or Firm*—Eric P. Schellin

[57] ABSTRACT

The method comprises, after the end of the normal combustion of the mixture in the combustion chamber of the engine, establishing a post-combustion by maintaining a series of high-tension sparks during a long period and introducing turbulent additional air in the vicinity of said sparks so as to form a plasma which is propagated in said residual mixture. The plasma is propagated in the cylinder from a plurality of points, that is to say partly from a point near to the spark and partly from at least another point of the combustion chamber.

5 Claims, 3 Drawing Figures

METHOD FOR REDUCING POLLUTION DUE TO AN INTERNAL COMBUSTION ENGINE

The present invention relates to a number of improvements in a pollution-reducing device for internal combustion engines disclosed in U.S. Pat. No. 4,061,113.

According to said patent, the object is to achieve a post-combustion in the combustion chamber of the engine during a part at least of the expansion and possibly of the exhaust of the burnt gases. The method comprises maintaining the spark or discharge of the spark plug and injecting into the combustion chamber in a suitable manner a certain amount of additional air, possibly with fuel added thereto. The discharge is maintained by prolonging the supply of current to the spark plug so as to form a substantially continuous train or series of sparks between the electrodes or possibly by striking a new arc or train of sparks at the end of the normal combustion with the same spark plug or even with a second spark plug by means, for example, of a suitable conventional distributor or an electronic distributor. The additional air permits the termination of the combustion and the oxidation of the residues of combustion and ensures an improved scavenging of the burnt gases to allow a more complete filling of the combustion chamber. It has been found particularly advantageous in this method to inject this additional air in the immediate vicinity of the electrodes and preferably directly in the spark plug. To this end, said patent dislcoses several types of spark plugs adapted for this purpose. They comprise generally a central high-tension electrode which terminates in a deflector so that the air arriving between this electrode and the coaxial screwthread cylindrical part constituting the earth of the spark plug fans out in a swirling motion. The considerable difference of potential between the two electrodes forms an arc and therefore produces a plasma by ionization of the air circulating in the gap. The circulation of air also effectively cools the spark plug and therefore prolongs the spark or discharge. In the ensuing description such a spark plug will be termed a gyratory plasma spark plug.

In a modification, in order to maintain a temperature promoting the post-combustion, instead of injecting solely the air there is injected air carburetted by a gas or the fuel employed.

The air or the carburetted air may also be introduced in a cavity provided in the cylinder head at the height of the screwthread of the spark plug which is provided with a plurality of orifices communicating with this cavity. This air then enters by way of the orifices, the interior of the spark plug and then between the two electrodes.

In another embodiment, the air or the carburetted air is introduced, not by way of the spark plug but by way of a further orifice in the cylinder head. A valve, controlled for example by the camshaft, is then provided for regulating this additional flow of air. This is more particularly applicable in the case where spark plugs of conventional type are employed.

Tests have revealed that the device gives satisfactory results as concerns the reduction of pollutants for all types of engines having a controlled ignition. The method was found to be particularly advantageous in the case of the rotary piston engine in which the spark or discharge is maintained during a large part of the passage of the piston in front of the spark plug which permits igniting practically the whole of the carburetted mixture and ensuring a more complete combustion than with conventional ignitions, even those comprising two spark plugs. The device may of course be employed in the ignitions of rotary engines having one or more spark plugs. In the latter case, the spark plug or spark plugs ensuring the post-combustion stage will be preferably of the gyratory plasma type.

However, the object of the present invention is to still further improve the ignition of the mixture and to raise the degree of turbulence which promotes the formation and propagation of the plasma and consequently improves the efficiency of the post-combustion.

According to this invention, the plasma is propagated not only from a point near to the high-tension electrode but also from at least another point by way of an opening formed in the cylinder head.

In a preferred embodiment, a passageway puts the space between the electrodes in communication with the opening in the cylinder head. A plurality of orifices may open onto the upper part of the cylinder so as to ensure an injection of air or carburetted air which is more homogeneous and to improve the turbulence in the chamber, all of these different orifices being connected to the spark plug. With this arrangement, moreover, the carburetted mixture can circulate between the electrodes during the compression and the propagation of the flame in all the zones of the combustion chamber is promoted.

It will be necessary to arrange that the supply of air or carburetted air can vary with the load of the engine: maximum at idling speed at which the combustion is the most incomplete, and minimum when accelerating.

A better understanding of the invention will be had from the Figures of the accompanying drawings which are given by way of example.

In the drawings:

FIG. 1 is a sectional view of the upper part of a cylinder of a reciprocating piston engine, the plane of the section being chosen in such manner as to avoid showing the valves.

Figure 1:
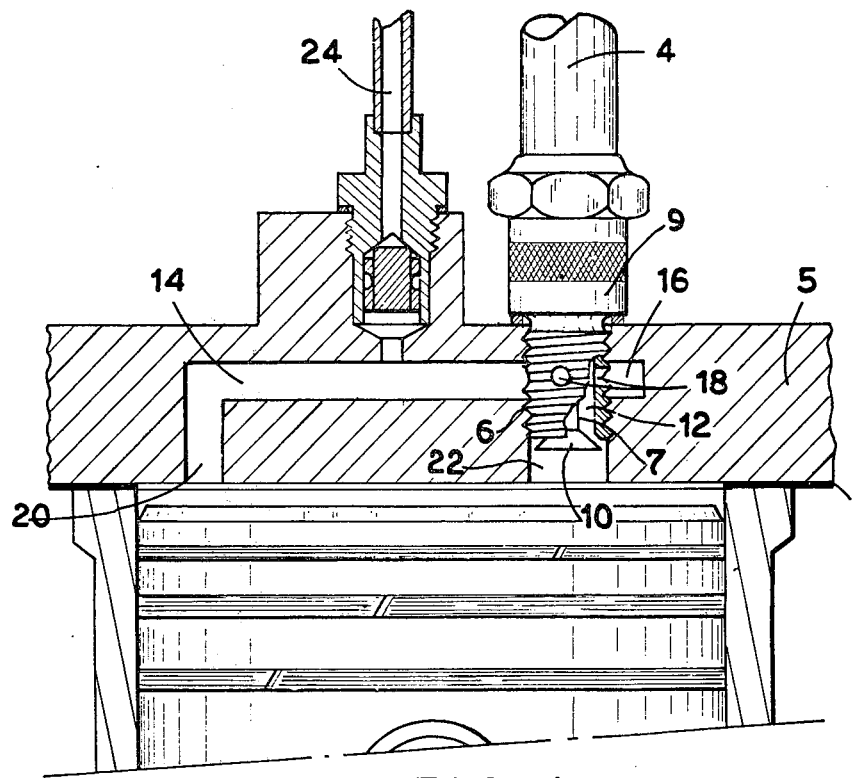
FIG. 1 is a sectional view of the upper part of the cylinder of a reciprocating piston engine according to the invention.

A spark plug 4 is fixed in the cylinder head 5 by a screwthread 6. It comprises a high-tension central electrode 7, which terminates in a flared portion or wirler 10 which provides a larger ignition surface area, and an earth electrode 9, these electrodes being separated by an insulator and by an annular passage 12 (FIG. 1) which opens onto the region of the flared portion 10 and enables the air or the carburetted air to be introduced between the ends of the electrodes 7 and 9.

A passageway 14 formed in the cylinder head 5 communicates with a cavity 16 in the region of the screwthread 6 of the spark plug which is provided with one or more orifices 18 which put the passageway 12 between the electrodes in communication with the cavity 16. The passageway 14 furthermore communicates with the upper part of the cylinder at the opening 20. It will be understood that a plurality of openings 20 may be provided in the upper part of the cylinder, each one thereof being connected to the cavity 16 by a passageway. Air or carburetted air is injected into the passagway 14 by way of a piping 24 which has a suitable distribution system, such as a valve, flap-valve or distributor, and is connected to a compressor or other source of fluid. The air or carburetted air thus injected is sent to the spark plug which it enters by way of the cavity 16 and the orifices 18, and furthermore to the opening or openings 20. This arrangement improves the turbulence in the cylinder and therefore the efficiency of the post-combustion stage. Indeed, when the air is injected by way of the piping 24 and the passageway 14, while the spark plug 4 produces a train of sparks or discharges which succeed in a continuous manner that of the normal combustion or are produced after a slight pause or dead time, this air or carburetted air leaves the passageway 12 with a swirling motion due to the flared portion or swirler 10. This swirling air divides the sparks or discharges and creates in the cavity 22 of the cylinder head between the end of the spark plug 4 and the cylinder, an ionization zone which is propagated in the cylinder. The ionized particles then encounter the air arriving by way of the openings 20, which creates a new turbulence and accelerates the propagation in the cylinder while completing the combustion as the piston effects its expansion stroke. Another advantage of this arrangement is that it circulates the carburetted mixture between the spark plug electrodes by way of the passageway 14 during the compression stage; in the course of the ignition, the increase in the pressure in the cavity 22 permits a circulation of the flame by way of the passageway 14 which causes the ignition of the mixture located in the region of the openings 20 and therefore a more complete combustion of the whole of the carburetted mixture.

A second spark plug could be if desired mounted at the outlet of the opening 20.

Figure 2:
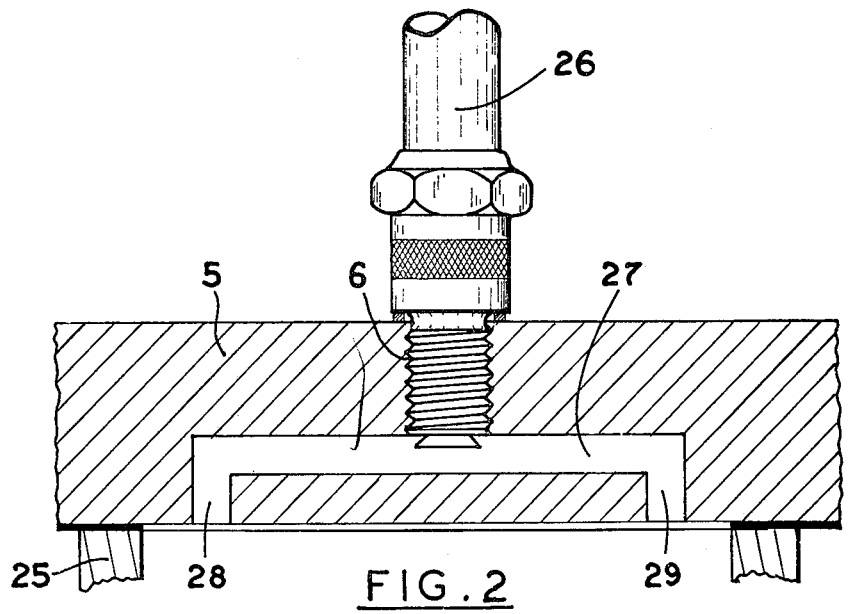
FIG. 2 is a view of a modification of the embodiment shown in FIG. 1.

FIG. 2 shows a modification of the embodiment shown in FIG. 1 and is a sectional view of the upper part of a cylinder of a reciprocating piston engine. The spark plug 26 is placed in a region which is such that its electrodes project into the passageway 27 which communicates with the combustion chamber by way of at least two orifices 28, 29. The injection of the air or carburetted air occurs preferably in this case directly through the spark plug 26 and through a pipe which connects the passageway 12 to a source of gas, as described in said main patent. The orifices 28, 29, in the same way as the orifices 20, are preferably located in the vicinity of the lateral wall 25 of the cylinder so that the ionized particles propagate the flame as far as this wall which ensures the combustion of practically the whole of the unburnt gases.

The first stage of combustion or normal combustion, is itself improved by this arrangement. Indeed, the carburetted mixture is introduced between the electrodes during the compression cycle and, upon ignition, the flame is propagated in the various parts of the passageway and enters the combustion chamber by way of the orifices 28 and 29 which permits igniting the mixture at several points.

Figure 3:
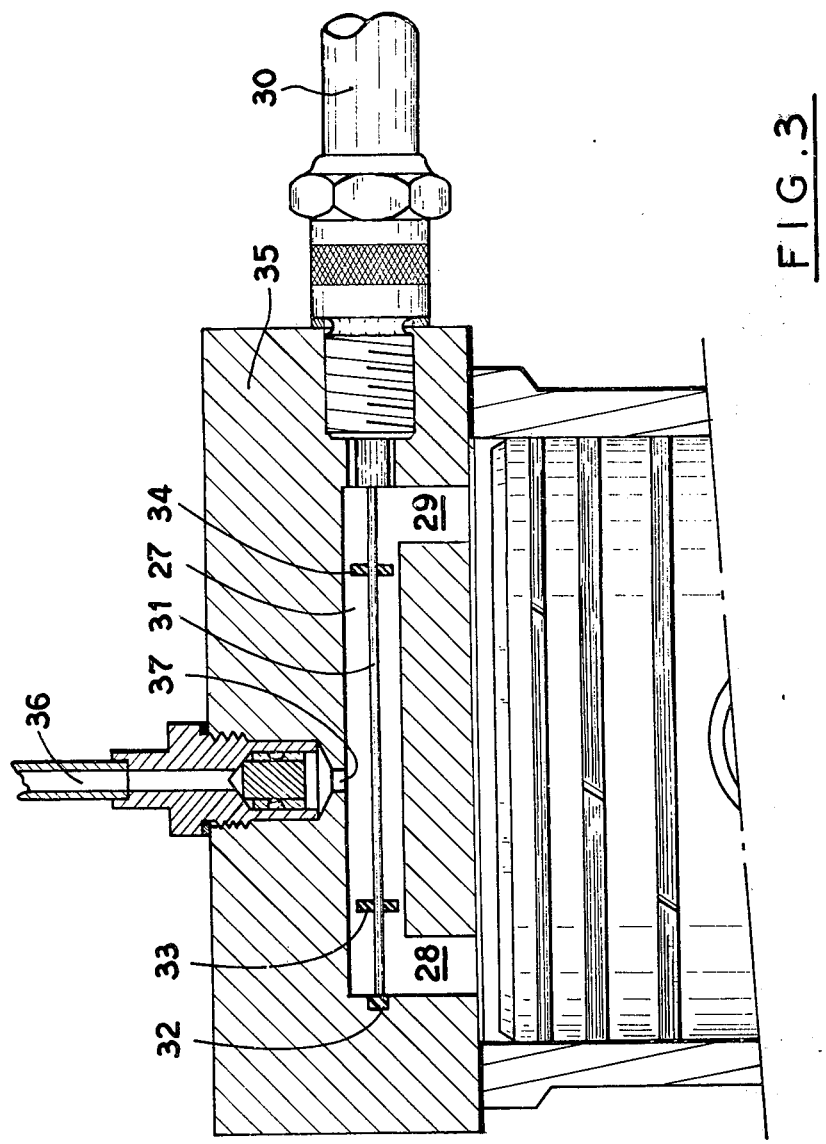
FIG. 3 is a view of another modification of the embodiment shown in FIG. 1.

According to another modification, shown in FIG. 3, the cylinder head 35 has one or more passageways 27 which are straight or circular and the ignition spark plug 30 which is mounted in the cylinder head 35 to be parallel to one of said passageways, comprises an electrode 31 which extends throughout the length of this passageway and is fixed by an insulator 32. This electrode 31 preferably carries two swirlers 33 and 34 spaced apart from each other. The additional post-combustion air or mixture, in the same way as the combustible mixture, can be introduced directly through the spark plug 30 or by way of piping 36 which communicates with the passageway 27 between the two deflectors 33 and 34. In any case, the cylinder head 35 performs the function of the earth electrode, and the series or train of sparks shoots forth from the region of at least one of these swirlers 33 and 34 and the combustion is propagated toward the other along the electrode 31 and there is a circulation of ignited gas which promotes an improved combustion. The additional swirling air introduced in a continuous or sequent manner carries along the plasma formed by the orifices 28 and 29 in the cold zone formed by the cylinder where it is propagated.

It will be understood that the foregoing embodiments shown only for the case of a reciprocating piston engine are transposable to a rotary piston engine by disposing the spark plugs and ensuring the introduction of air or carburetted air at suitable points of the path of the piston corresponding to the different stages of the thermodynamic cycle described by the gaseous mass.

In the case of this rotary piston engine, it is possible to provide a spark plug for the conventional ignition and one or more spark plugs arranged in the region of the engine in which the gases expand. The injection of air or carburetted air required for the post-combustion then occurs also in a distributed manner in the region or each of the spark plugs so as to allow the formation of the plasma. The spark plugs ensuring the post-combustion may be interconnected by passageways permitting the injection of a part of the carburetted mixture carried along by the rotor between their electrodes; this arrangement avoids having to provide a special injection of carburetted air for the spark plugs.

It is clear that the invention permits a possible elimination of the starter of the engine owing to an injection of vaporized fuel in the cylinder in the expansion stage.

Having now described my invention what I claim as new and desire to secure by Letters Patent is:

1. A method for reducing the polluting effect of an internal combustion engine which comprises a cylinder, a piston movable in the cylinder and defining with the cylinder a combustion chamber, a spark plug and means supplying a mixture of fuel and air to the cylinder, said method comprising, after the end of the normal combustion of said mixture in the combustion chamber of the engine, establishing a post-combustion by maintaining a series of high-tension sparks during a long period and introducing turbulent additional air in the vicinity of said sparks so as to form a plasma which is propagated in a residue of said mixture in the chamber, the plasma being propagated by introducing said additional air into the chamber from a plurality of points, a part of said additional air being introduced from a point near to the spark and a part of said additional air being introduced from at least another point of the combustion chamber.

2. The method claimed in claim 1, comprising allowing a pause before the striking of said post-combustion series of sparks which is maintained during at least a part of the expansion stage of the operation of the engine.

3. An internal combustion engine comprising a cylinder, a cylinder head, a piston movable in the cylinder and defining with the cylinder a combustion chamber, means for supplying a mixture of air and fuel to the cylinder, at least one high-tension ignition spark plug comprising a high-tension electrode and an earth electrode, the electrodes defining a space therebetween, means defining an auxiliary air supply inlet opening onto the vicinity of the high-tension electrode; air guiding means imparting a swirling motion to the axuiliary air; means for controlling the opening of the auxiliary air inlet at least during the driving stroke of the piston; an electric supply circuit for supplying current to the spark plug comprising an ignition distributor having a rotary contact of such shape that it maintains the supply of current to the spark plug during the normal combustion of said mixture and during at least a part of the expansion stroke of the piston, at least one passageway in the cylinder head putting the space between the electrodes of the spark plug in communication with the combustion chamber at at least one point of the combustion chamber.

4. The engine claimed in claim 3, comprising a passageway having a rectilinear portion in the cylinder head and means defining two orifices to put the passageway in communication with the combustion chamber, the high-tension electrode being disposed in said rectilinear portion so that the arc is established between said high-tension electrode and the whole of the rectilinear portion, and means for injecting the air necessary for the post-combustion into the passageway.

5. The engine claimed in claim 3, wherein said spark plug has a body having a screwthreaded portion defining an orifice, and the cylinder head has a cavity in the region of the screwthread portion, the engine further comprising means for injecting between the electrodes of the spark plug and by way of said cavity and said orifice in said screwthreaded portion the air or the carburetted air for forming the plasma in the course of the production of the series of post-combustion sparks.

* * * * *